H. POWER.
SANDING DEVICE.
APPLICATION FILED AUG. 21, 1918.
1,362,350.
Patented Dec. 14, 1920.
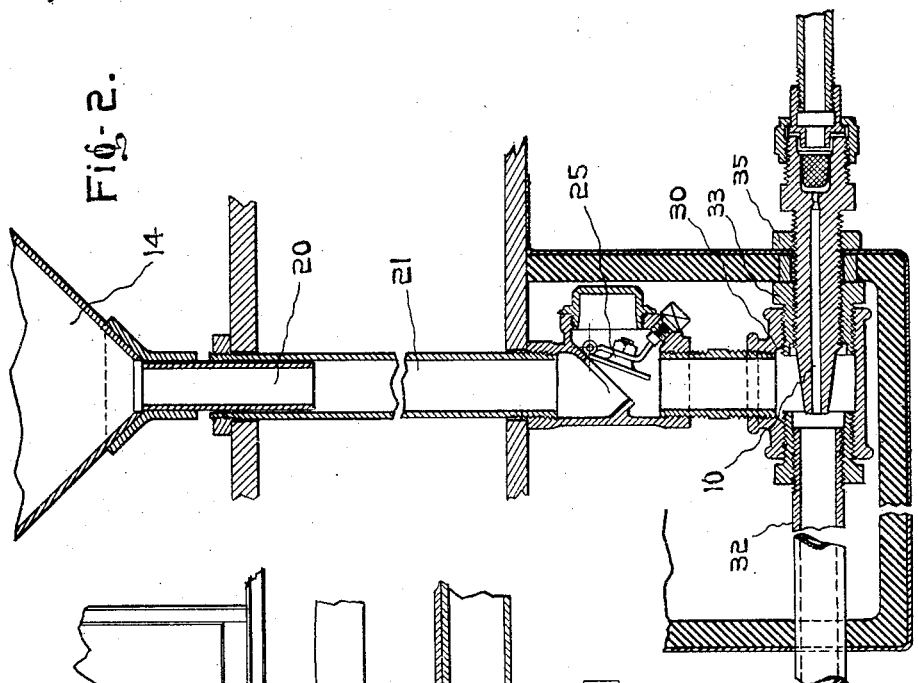
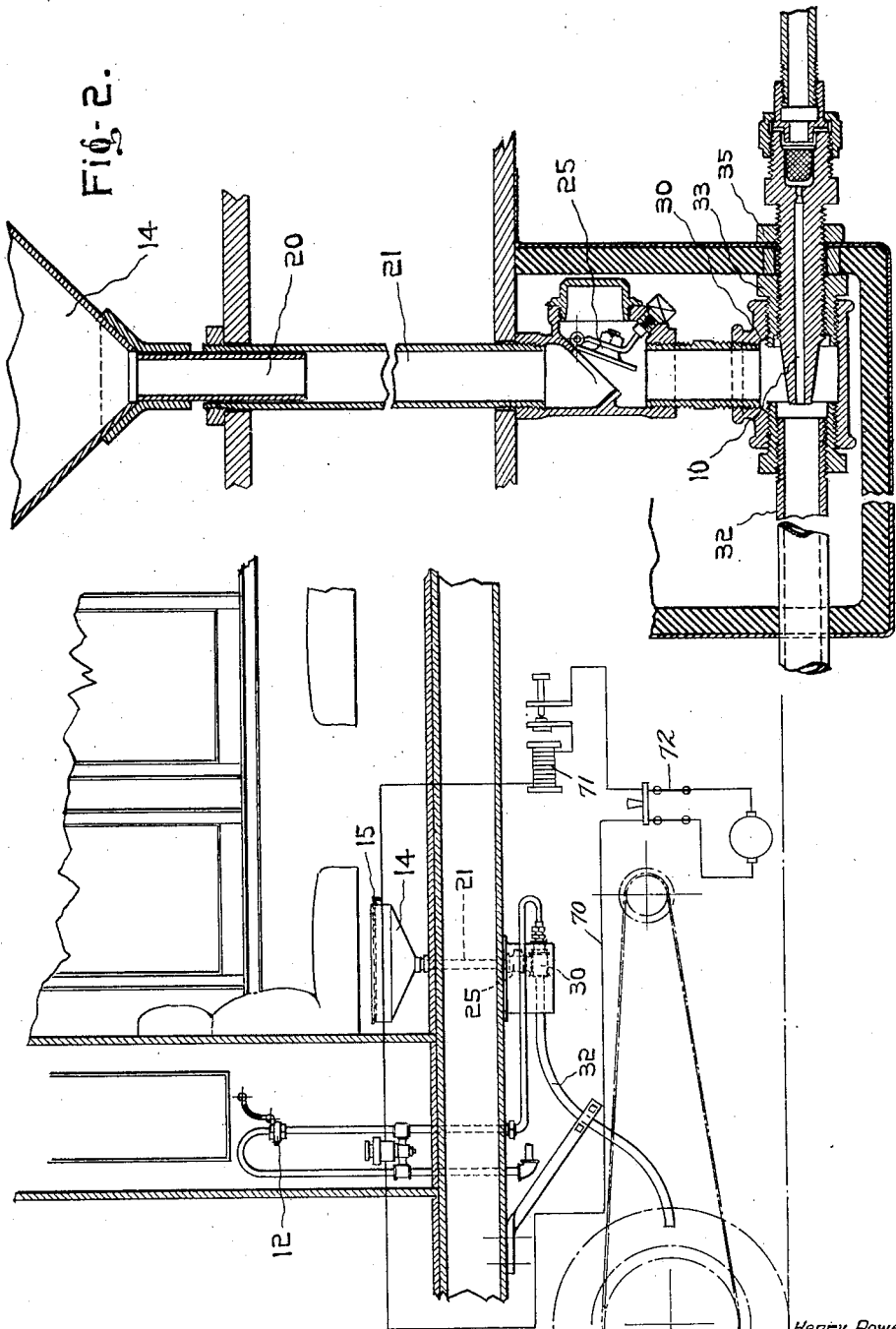
Witnesses.
Henry Power
Inventor.
Attorney.

UNITED STATES PATENT OFFICE.

HENRY POWER, OF MONTREAL, QUEBEC, CANADA, ASSIGNOR OF ONE-HALF TO WILLIAM HALTON, OF MONTREAL, QUEBEC, CANADA.

SANDING DEVICE.

1,362,350.  Specification of Letters Patent.  Patented Dec. 14, 1920.

Application filed August 21, 1918. Serial No. 250,881.

*To all whom it may concern:*

Be it known that I, HENRY POWER, a subject of the King of Great Britain, and resident of the city of Montreal, in the Province of Quebec, Dominion of Canada, have invented certain new and useful Improvements in Sanding Devices; and I hereby declare that the following is a full, clear, and exact description thereof.

Heretofore considerable inconvenience and loss have been experienced in the generation of electric power by the pulley and belt drive connecting an axle of a car with a dynamo, owing to the fact that under certain conditions friction between the pulley and belt is reduced to such an extent that the pulley actually loses its grip on the belt and rotates freely without it. Many attempts have been made to increase the holding power of the belt and pulley by changing the structure of one or the other without avail and my invention is to cure this defect and increase the friction, and thus overcome the slipping between pulley and belt whenever the prevailing conditions require and particularly during the winter season when snow and ice frequently completely destroy the friction between the pulley and belt.

I solve the problem by providing a device which will project sand or other gritty material to the contact surfaces of pulley and belt. More specifically stated the invention consists of an axle, a dynamo, a pulley on the axle, and a belt looped around the pulley, and an operative connection therebetween and the dynamo, of means for projecting sand into the contacting surfaces of the pulley and belt and electrical means operated by the circuit of the dynamo for controlling the projection of the sand.

For full comprehension however, of my invention, reference must be had to the accompanying drawings in which similar reference characters indicate the same parts and wherein:

Figure 1 illustrates in elevation a portion of the frame of a passenger car equipped with my invention; and Fig. 2 is an enlarged vertical sectional view through the sand projecting tube, nozzle, delivery tubes, and connection between the sand delivering tube and sand box.

The apparatus is designed to produce the desired results with the least practical amount of sand and compressed air, the principle being to use a small stream of sand at relatively high velocity, and this only when additional friction between pulley and belt is known to be necessary. This reduces the wear of the belt and pulley to a minimum. In fact it is reasonable to believe that it actually saves wear as compared with continued slipping of the pulley within the belt.

Compressed air is used in an economical manner by passing same through a discharge nozzle 10 designed to produce high velocity, this requiring a minimum amount to produce the desired results, the operation being controlled manually or by an electrically operated automatic control valve. For manual control of the sand an operating cock 12 is placed in the vicinity of the switch panel (as indicated in Fig. 1) so that trainmen when holding the operating cock open may have a view of the voltmeter, and as soon as the voltmeter indicates that the dynamo is generating, the operating cock may be allowed to close, thus shutting off the application of sand. The electrically operated automatic control valve employed by me is preferably of the type commonly used on the cars of electric railways for signaling, the valve stem constituting the armature of a solenoid. This solenoid is included in an electric circuit 70 and is magnetized by current generated by the dynamo. To secure an intermittent operation of the valve a "make and break" device 71 is included in the circuit 70. The automatic valve may be disconnected from the dynamo by a switch 72.

The apparatus for supplying the sand to the contacting surfaces of the pulley and belt comprises a box 14 to contain the sand or other comparatively dry gritty substance referred to hereafter as "sand." The sand box is fitted with a comparatively tight cover 15 adapted to be held against displacement by the vibration of the car or other causes, and it may be of any desired shape and located in any convenient place on the car or may be sunk in the floor or placed underneath the car floor. It is preferable, but not absolutely necessary, that the bottom of the box be inclined toward the outlet tube so as to discharge all of the contents by gravity. The lower end of the neck 20 enters loosely into the upper end of the sand delivery tube 21 which is sufficiently large to provide an outlet for upwardly flowing air due to back pressure in the ejector and caused by stoppage of the sand projecting tube, or other cause. The free escape of this back pressure air prevents air pressure accumulating in the sand box and straining it and possibly scattering its contents. This emergency air outlet is to take care of the first impulse due to the deflection of the air, but this is not sufficient to compensate for sustained blockage. To obviate the continued leakage of the back-pressure air a swinging check valve 25 is located in the delivery tube 21 and adapted to remain open under normal condition of operation and automatically close when there is a continued flow of sand and air or air alone in the reverse direction.

The ejector is attached to the lower end of the tube 21 and consists of an ejector body 30 presenting a T-chamber to receive the sand delivered through the tube by gravity. One end of the ejector body is connected to a tube 32 for projecting the sand against the contact surfaces of the belt and pulley. The opposite end of the ejector body is fitted with a bushing 33 in which is screwed the adjustable nozzle 10. The end of this nozzle through which the air is discharged is disposed near the inner end of the sand-projecting tube so that only a small amount of sand flows by gravity in front of the nozzle. The exact position of the nozzle may be adjusted however by screwing it into, or out of, the ejector body, and when correctly adjusted it is secured by means of a lock nut 35 screwed tightly against the end of the ejector body. The air discharge opening may be straight or cone shaped, and of such proportions as to produce the maximum velocity. In operation the discharge of air from the nozzle into the projecting tube will tend to produce a vacuum which assists gravity in bringing down sand where it will be thrown or drawn into the projecting tube.

The projecting tube extends from the ejector to a point within the space inclosed by the pulleys and belt, and preferably is directed toward the center of the pulley, in such a manner that regardless of direction or rotation of the driving pulley the sand will be quickly carried to the belt where it will produce increased friction to overcome the undesired slipping.

To provide for normal movement of car trucks relative to the car body, the sand-projecting tube is supported, from the car body only, by any convenient arrangement of hangers or braces indicated at 40. This tube is preferably placed to one side of the top line of the belt, and passes it at an angle so that the end of the tube will be directed as nearly as possible to the center of the pulley.

In order to protect the ejector from the dampness of the atmosphere beneath the car, due to escaping steam or other causes, an insulated box 60 of either metal or wood incloses the same and the bushing 30 of the nozzle is fitted into one side thereof permitting the nozzle to be adjusted without disturbing the connections between the box and the ejector body or opening the box, and without disturbing the filler with which the box is packed to protect the ejector.

What I claim is as follows:—

1. In a railway passenger car equipment the combination with an axle, a dynamo, a pulley on the axle, and a belt looped around the pulley, and an operative connection there-between and the dynamo, of means for projecting sand between the contacting surfaces of the pulley and belt and means operated by the circuit of the dynamo for controlling the projection of the sand.

2. In a railway passenger car equipment the combination with an axle, a pulley on the axle, a belt looped around the pulley, an electric circuit, a dynamo included in said circuit and constructed and arranged to be driven by said belt, of means for supplying sand to the contacting surfaces of the pulley and belt and an electrically operated valve operated by said circuit and constructed and arranged to control the supply of sand to the surfaces.

In testimony whereof I have signed my name to this specification in the presence of two witnesses.

HENRY POWER.

Witnesses:
GORDON G. COOKE,
WILLIAM J. C. HEWETSON.